(12) United States Patent
Shen et al.

(10) Patent No.: US 7,986,833 B2
(45) Date of Patent: Jul. 26, 2011

(54) IMAGE PROCESSING METHOD AND APPARATUS FOR COLOR ENHANCEMENT AND CORRECTION

(75) Inventors: Chung-Li Shen, Taipei (TW); Yu-Shan Hsu, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 1402 days.

(21) Appl. No.: 11/436,173

(22) Filed: May 18, 2006

(65) Prior Publication Data

US 2007/0115518 A1    May 24, 2007

(30) Foreign Application Priority Data

Nov. 22, 2005    (TW) .............................. 94140967 A (51) Int. Cl.
*G06K 9/00* (2006.01)
*G06K 9/46* (2006.01)
*G06K 9/66* (2006.01)
*G06K 9/40* (2006.01)

(52) U.S. Cl. ........ 382/167; 382/162; 382/190; 382/254; 382/274

(58) Field of Classification Search .................. 382/167, 382/162, 190, 254, 274
See application file for complete search history.

(56) References Cited

U.S. PATENT DOCUMENTS

| | | | | |
|---|---|---|---|---|
| 5,283,635 | A * | 2/1994 | Suzuki et al. | 358/516 |
| 5,555,022 | A * | 9/1996 | Haruki et al. | 348/223.1 |
| 6,574,363 | B1 * | 6/2003 | Classen et al. | 382/165 |
| 6,642,957 | B1 * | 11/2003 | Taura | 348/223.1 |
| 2003/0174222 | A1 * | 9/2003 | Uchida | 348/241 |

* cited by examiner

*Primary Examiner* — Bhavesh Mehta
*Assistant Examiner* — Bernard Krasnic
(74) *Attorney, Agent, or Firm* — Winston Hsu; Scott Margo (57) ABSTRACT

An image processing method and an image processing apparatus for color correction are provided. The image processing method for color correction comprises the steps of: (a) determining an angle on a color space according to an image data of a basic color, (b) determining a first straight line on the color space according to the angle, (c) determining a second straight line on the color space according to an image data of a pixel, wherein the second straight line is parallel to the first straight line, (d) calculating a distance between the second straight line and the first straight line in order to obtain a color intensity difference value, (e) correcting the image data of the pixel according to the color intensity difference.

14 Claims, 10 Drawing Sheets

IMAGE PROCESSING METHOD AND APPARATUS FOR COLOR ENHANCEMENT AND CORRECTION

BACKGROUND OF THE PRESENT INVENTION

1. Field of Invention

The present invention relates to an image processing method and apparatus utilizing a design of a hardware circuit or a program to execute color enhancement and correction, and more particularly to an image processing method and apparatus utilizing a chromaticity diagram in different color space to process digital color image data for color enhancement and correction.

2. Description of Related Arts

There are a variety of conventional image processing techniques for processing color enhancement and correction of digital color image data. In conventional image processing, many color scales, so called "color spaces," are used in various conventional image processing techniques to process color enhancement and correction of digital color image data. However, a variety of conventional image processing techniques usually utilize an independent color space to convey color values in numerical terms. In other words, an independent color space is used as an intermediate representation of the image. For example, this color scale or "color space" is known as RGB (Red, Green, and Blue) color space. Other color spaces are known, such as CMY (cyan, magenta, yellow) color space, CMYK (cyan, magenta, yellow, and black) color space, YIN (luminance and chrominance) color space, ... etc. Conventional image processing techniques usually utilize the color look up table (CLUT) method and the piecewise linear approximation method to implement color enhancement and correction of digital color image data.

Figure 1:
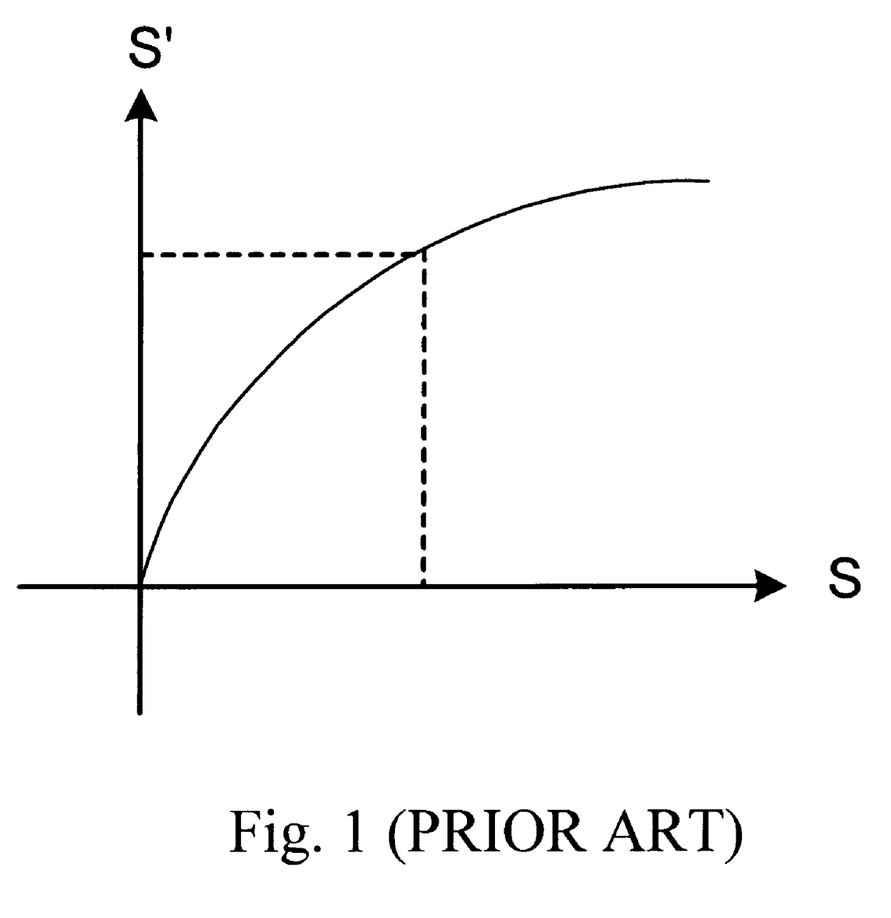
FIG. 1 is a graph showing a conversion relationship of a color look up table (CLUT).

In the color look up table (CLUT) method, a threshold value of the pixel of interest corresponding to a point of skin of a person's image in most cases is predetermined. Similarly, as to such object images as blue sky and green leaves of trees, a threshold value of the pixel of interest corresponding to a point of such object images is predefined. An object applicable to image processing and conditions thereof are specified and then image processing is carried out for object pixels. If the value of the object pixel is within a range of the threshold value, the value of the object pixel could be adjusted as desired by means of the CLUT. FIG. 1 is a graph showing a conversion relationship of a color look up table (CLUT). It may be necessary to load specific color look-up table entries from external memory to on-chip memory before a color look-up table (CLUT) is utilized. Hence the difficulty and problem associated with conventional image processing techniques utilizing the color look up table (CLUT) method is that sufficient memory is necessary for storing the color look-up table (CLUT). It will waste a lot of memories.

Figure 2:
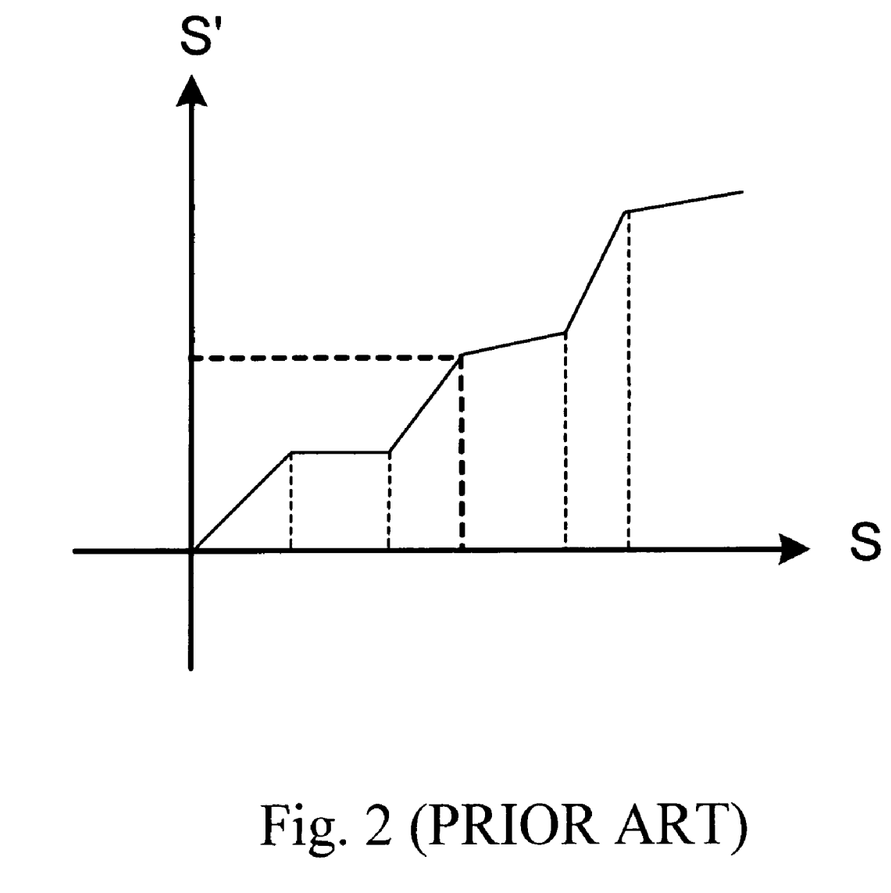
FIG. 2 is a graph showing a conversion relationship of piecewise linear approximation.

As shown in FIG. 2, in the piecewise linear approximation method, each of digital image data can be divided into several line segments of object pixels with slope discontinuities. Color enhancement and correction of each line segment of object pixels could be adjusted by means of the different slope of the line segment in the piecewise linear approximation method. Although the color enhancement and correction of a digital image data in the piecewise linear approximation method provides a desired effect on the digital image data, it may cause an undesired side effect thereon. The main difference between the color look up table (CLUT) method and the piecewise linear approximation method is that the color enhancement and correction of a digital image data in the piecewise linear approximation method causes an inharmonic side effect thereon.

SUMMARY OF THE PRESENT INVENTION

A main object of the present invention is to provide an image processing method and apparatus for color correction and enhancement utilizing a chromaticity diagram in any color space to execute color correction and enhancement of a digital color image data to obtain smooth and soft digital color image data without extra memory.

Another object of the present invention is to provide an image processing method and apparatus to make change of the value of each pixel of the digital color image in sequence in operational processing so as to get the smoothest effect in color correction and enhancement.

Another object of the present invention is to provide an image processing method and apparatus for color correction and enhancement utilizing the calculation algorithm, $GAIN*\{2"-[Y-X*\tan(\theta)]\}$ when $\{2"-[Y-X*\tan(\theta)]\}>0$, to make change of the value of each pixel of the digital color image in sequence in color correction and enhancement processing so as to get the smoothest effect.

Accordingly, in order to accomplish the one or some or all above objects, the present invention provides an image processing method for color correction, comprising the steps of:
(a) determining an angle on a color space according to an image data of a basic color;
(b) determining a first straight line on the color space according to the angle, wherein the first straight line makes the same angle with the color space;
(c) determining a second straight line on the color space according to an image data of a pixel and the angle, wherein the slope of the second straight line is the same to that of the first straight line;
(d) providing a processing range parameter and according to the processing range parameter, determining a third straight line and a fourth straight line of two color correction range lines which are parallel to the first straight line, wherein the first straight line is a center line between the third straight line and the fourth straight line;
(e) determining at least one another color correction range bounded line according to the processing range parameter and dividing several regions among the color correction range bounded line, the third straight line, and the fourth straight line, wherein every region respectively corresponds to a correction value;
(f) determining the color intensity difference value according to the correction value corresponding to the region on which the image data of the pixel is located; and
(g) correcting the image data of the pixel according to the color intensity difference value.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

DETAILED DESCRIPTION OF THE PREFERRED EMBODIMENT

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Figure 3:
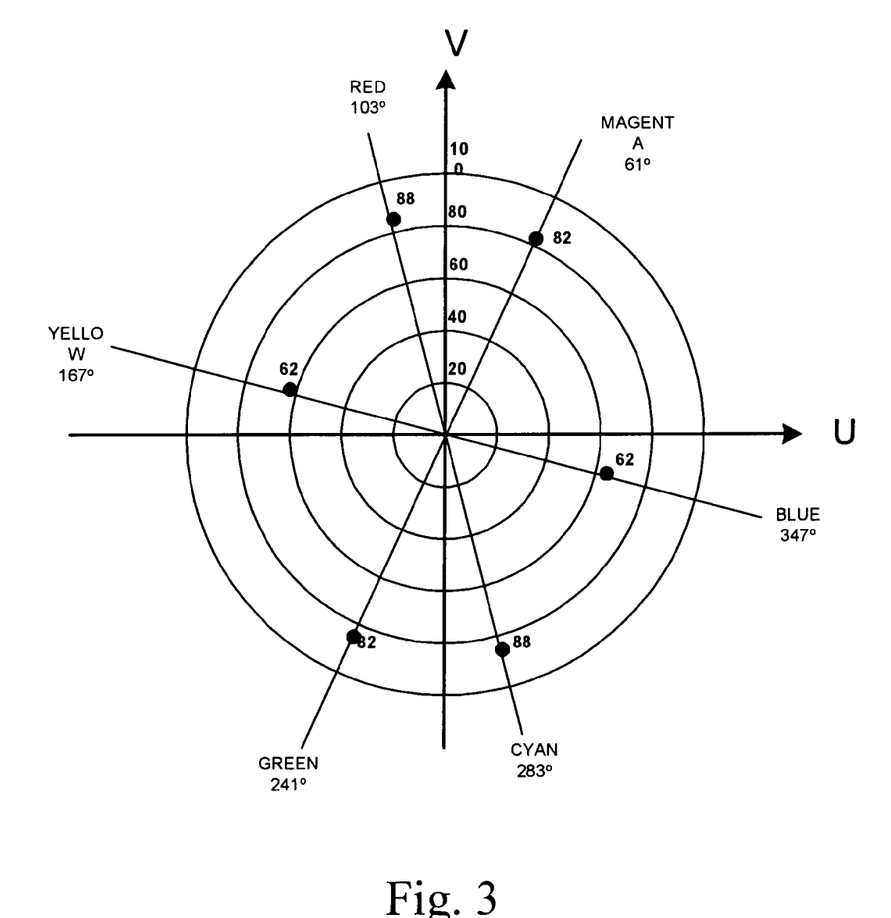
FIG. 3 is a chromaticity diagram of the color space according to a preferred embodiment of the present invention.

Referring to FIG. 3 of the drawings, a chromaticity diagram of the color space according to a preferred embodiment of the present invention is illustrated. Note that in describing different video formats, the YUV video format is frequently mentioned and used throughout the specification. It is common knowledge that YUV is a video color model in which luminance information (Y) is separated from chrominance information (U and V). Such YUV video components are often written in a variety of ways: (1) Y, R-Y, B-Y; (2) Y, Cr, Cb and (3) Y, Pa, Pb, etc. The following description of YUV video should be understood as applied to all compatible and derivative digital video formats. As shown in FIG. 3, in a chosen color space, an object color is represented by a corresponding angle (within the range of) 0°~90° and a corresponding quadrant as indicated on the U-V coordinate axes when executing color correction and enhancement processing. At the same time, the processing range parameter n of a straight line corresponding to angle and quadrant of the object color and a color gain must be set as basic input parameters. According to x-axis and y-axis on the color space (U-V coordinate, Cb-Cr coordinate, or B-Y coordinate, and R-Y coordinate for example), the value of color gain can be adjusted. An object color on different color space can respectively correspond to different angle and quadrant. Additionally, the mentioned range of the angle could be within 0°~360°, so that it can reduce the judgment of the quadrant. In this preferred embodiment, it uses an angle within the range of 0°~90° on the first quadrant plane for example to explain.

Figure 4:
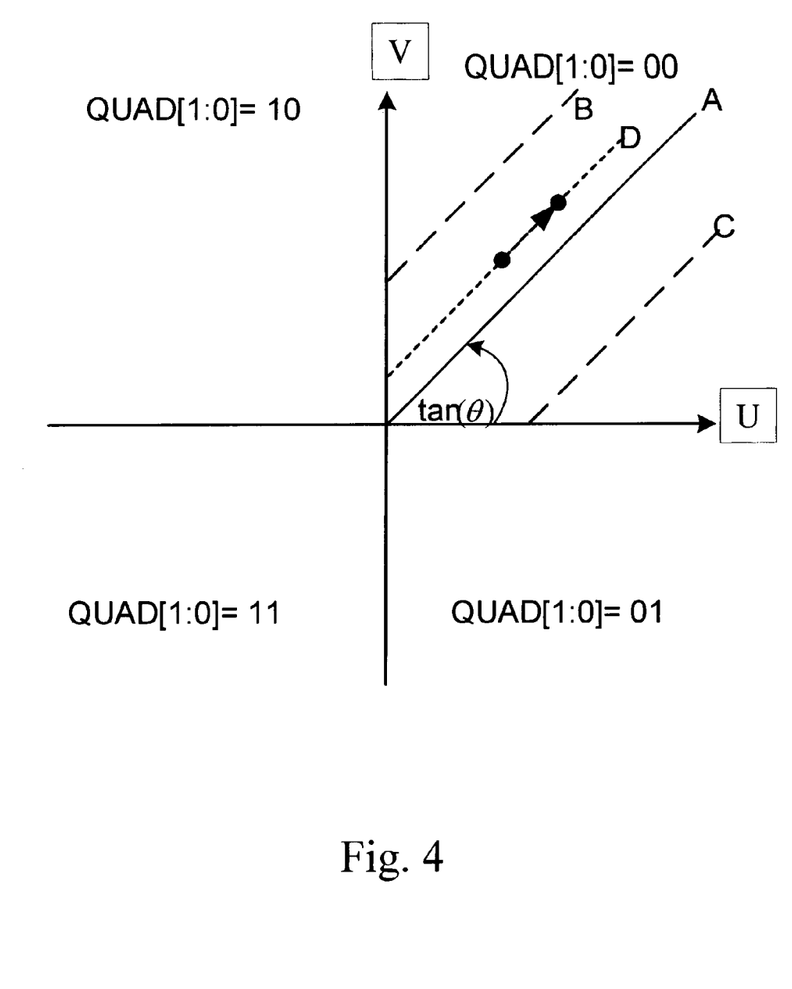
FIG. 4 is a hue angle of the object color located on the first quadrant of a U-V chromaticity diagram of the color space according to another preferred embodiment of the present invention.

For a start, at the function of color correction, it must predetermine a basic color in a presetting color range, and the basic color is called an object color. As shown in FIG. 4, a hue angle of the object color could be represented by a straight line A making an angle θ with the X-axis. It utilizes the angle θ to obtain a straight line D which has the same angle with the angle θ. In other words, the two straight lines A and D own the same slope. Two parallel straight lines B and C are parallel to the straight line A and the distance between the two parallel straight lines B and C are defined by n which is represented by an input processing range. Hence, the color correction of the digital color image data of any pixel could be implemented by the reference lines A, B, C as indicated on the X-Y coordinate of the color space. When a digital color image data of a pixel (the straight line D) is located within the two parallel straight lines B and C, it starts to process a color correction for the straight line D and the direction of the color correction is from the straight line D toward to the straight line A.

According to the distance between the straight line D and the center line A, it could adjust the color intensity value of the pixel gradually in a continuous manner. In other words, the color intensity difference value could be gradually increased or decreased in a continuous manner. There could be several intervals between straight lines A, B or straight lines A, C and the several intervals are parallel with straight lines A, B or straight lines A, C, wherein every interval is given a suitable correction value respectively. If there are more intervals between straight lines A, B or straight lines A, C, as a result, the color correction of the digital color image data could be smoother. Therefore, when the straight line D lies in the interval between straight lines A, B or straight lines A, C, the color intensity difference value between straight lines D, B or straight lines D, C could be obtained. The adjustment method lets a straight line D gradually and parallelly be moved toward to the straight line A, thereby causing smooth change of color correction of the digital color image data of the pixel in the entire compensating range and preventing an undesired side effect between the color correction region and the outer region.

After obtaining an adjusted color intensity difference value, the adjusted color intensity difference value is multiplied by the color gain to execute color enhancement processing. The calculation result of the adjusted color intensity difference value multiplied by the color gain is not suitable to output directly because aforementioned color correction just focuses on the hue angle of the object color located on the first quadrant of the X-Y coordinate of the color space (within the range of 0°~90°. However, the hue angle of the object color may be located on the second, third, or fourth quadrant of the X-Y coordinate of the color space. Accordingly, the output of color correction and enhancement of the pixel of the digital color image data needs to be further processed according to which quadrant the pixel of the digital color image data is located on. If the digital color image data of the pixel is not located on the quadrant which the object color is located on, the color correction and enhancement calculation will be stopped.

Then, the following calculation algorithm for color correction and enhancement according to the present invention is shown as below.

$$\text{GAIN}*\{2^n - |Y - X*\tan(\theta)|\}$$

when $\{2^n - |Y - X*\tan(\theta)|\} > 0$ wherein X, Y are a chromaticity value of the pixel of the U-V coordinate of the color space, θ is a hue angle of an object color, n is a processing range parameter GAIN is a presetting color gain of a color intensity (or the multiplication of the color gain and a correction value corresponding to parallel intervals). The color gain components are often represented by an X-axis color gain and a Y-axis color gain. If $\{2^n-|Y-X*\tan(\theta)|\}$ is smaller than zero, it means that the digital color image data of the pixel is not located on the color correction region and then the color correction will not be proceed. In other words, the GAIN value is set to zero. After the digital color image data of the pixel is added by the aforementioned X-axis color gain and a Y-axis color gain, a new digital color image data of the pixel will be obtained. The present invention could adjust the digital image data of the pixel gradually in a continuous manner when the image data of the pixel located is located on the color correction region.

Furthermore, when the range of the above mentioned angle is within 0°~360°, there need not exist a quadrant parameter to judge whether the digital color image data of the pixel is within the color correction range. However, when the range of the above mentioned angle is within 0°~360°, the quadrant of the digital color image data of the pixel could be judged so as to directly judge whether the digital color image data of the pixel is within the color correction range and the color correction is executed or not.

In the above detailed description of the preferred embodiment, it uses the center line A passing through the origin of the coordinate of the color space for example to explain. However, the center line A could be any straight line which is not passing through the origin of the coordinate of the color space. It will be obvious to one skilled in the art that the present invention may be practiced without these specific details. Moreover, the present invention could also add one or two correction range parameters R which are indicative of the distance from the origin of the coordinate of the color space. When the digital image data of the pixel is located within the range R, the color enhancement processing would be executed. This parameter is set forth to avoid that the digital image data of the pixel is located within the above mentioned range but not necessary to execute the color correction process when the digital image data of the pixel is too pale or too dark. The correction range parameter R could be defined as follows:

(1) The correction range parameter R could be a radius parameter. The origin of the coordinate is the center point. The value of the correction range parameter R is its radius. When the digital image data of the pixel is located inside the circle (outside the circle), the color enhancement would be processed. When the digital image data of the pixel is located outside the circle (inside the circle), the color enhancement would not be processed.

(2) The correction range parameter R could be a distance parameter. A vertical line is perpendicular to the center line A. The distance between the vertical line and the origin of the coordinate is the value of the correction range parameter R. When the digital image data of the pixel is located inside the distance (outside the distance), the color enhancement would be processed. When the digital image data of the pixel is located outside the distance (inside the distance), the color enhancement would not be processed.

(3) The correction range parameter R could be a parameter of a boundary condition equation. The correction range parameter R of the boundary condition equation could define a region or a boundary which could intersect straight lines B and C.

If the correction range parameter R have two values, according to the above description (1), (2), and (3), another circle and boundary line could be obtained. Hence the two circles or two straight lines B and C could define a region. The digital image data of the pixel could be executed the color enhancement when the digital image data of the pixel is located inside the region. On the contrary, the correction range parameter R of the boundary condition equation and the two straight lines B and C could define another region.

As mentioned above, if the above region could be divided into several intervals, as a result, the more intervals inside the above region could give proper correction values. Hence the color correction of the digital color image data could be smoother. In addition, the correction range parameter R and the processing range parameter n are indicative of different boundary lines. If these boundary lines are intersected, there exist corners of intersection which could be smoothed to avoid the unconformity of the adjusted digital image data.

Figure 5:
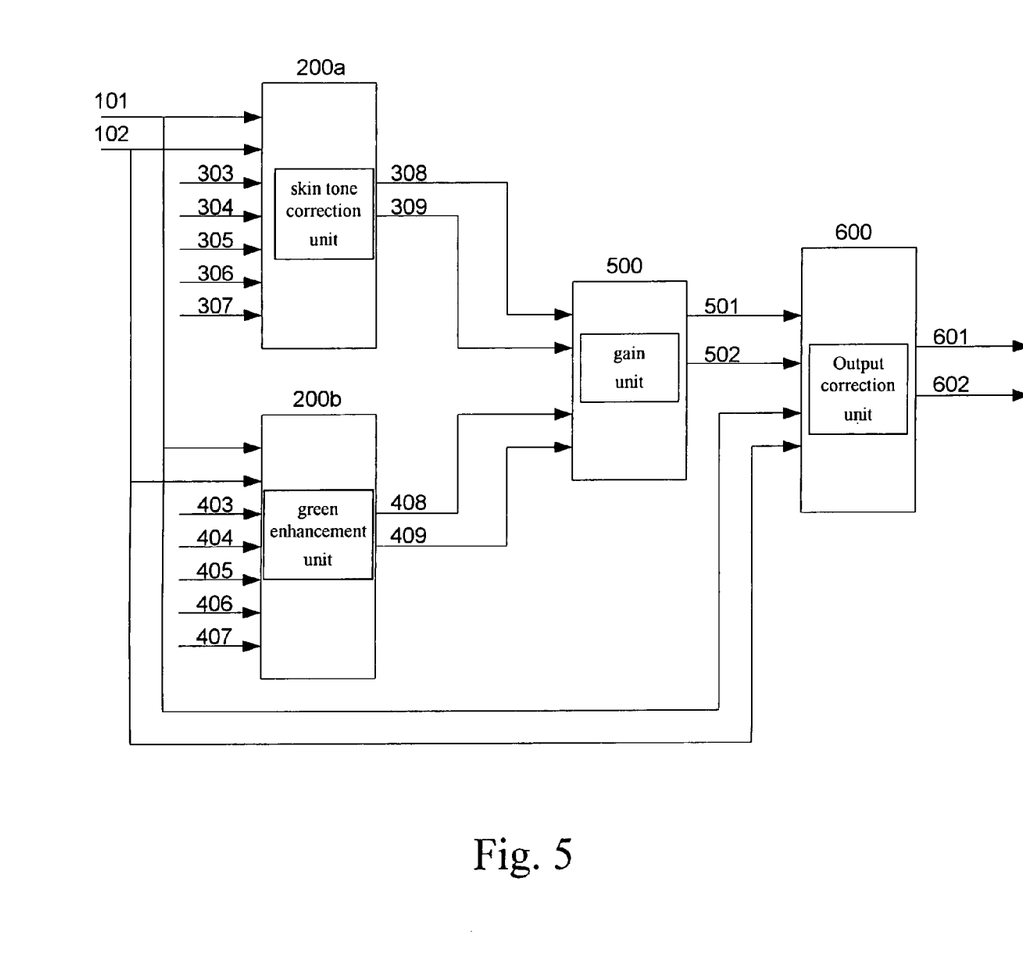
FIG. 5 is a block diagram showing an image processing apparatus for color correction and enhancement according to a preferred embodiment of the present invention.

Referring to FIG. 5 of the drawings, a block diagram showing an image processing apparatus for executing color correction and enhancement processing, and more especially for executing skin tone correction and green enhancement processing according to a preferred embodiment of the present invention is illustrated. The skin tone correction and green enhancement are usually utilized in static and dynamic color correction and enhancement processing.

As shown in FIG. 5, a skin tone unit correction unit 200a could immediately correct an error of skin of a person's image in most cases, thereby causing the image to have a natural and smooth appearance. On the other hand, the skin tone unit correction unit 200a could correct image data of skin of a person's image in most cases according to different colored people's feeling. A green enhancement unit 200b could create a green color of an image full of gradation and saturation. Hence the grassland, scenery, and another green image could look lively and vivid by utilizing this function.

Figure 6:
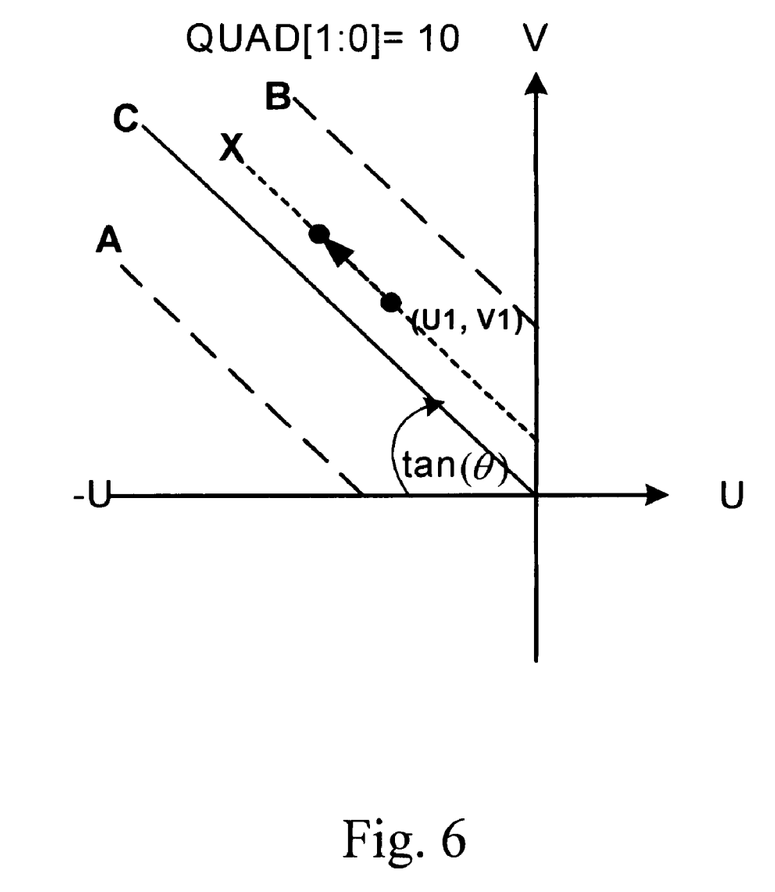
FIG. 6 is a hue angle of the object color located on the second quadrant of a U-V chromaticity diagram of the color space according to another preferred embodiment of the present invention.

As shown in FIG. 5, the skin tone correction unit 200a and the green enhancement unit 200b receive color signals 101, 102 respectively for executing color correction and enhancement proceeding. The skin tone correction unit 200a receives a color angle 303 of a skin tone of an object color. According to FIG. 3, the angle could be chosen between 167° and 103°. Accordingly, as shown in FIG. 6, the quadrant signal 304 of a straight line G is indicative of the second quadrant and delivered to the skin correction unit 200a. In addition, a compensating range setting 305 is specified between straight lines E, F as shown in FIG. 6. The skin tone correction unit 200a receives the compensating range setting 305, color gains 306, 307 and executes skin tone correction function to generate outputs of skin tone gains 308, 309.

Figure 7:
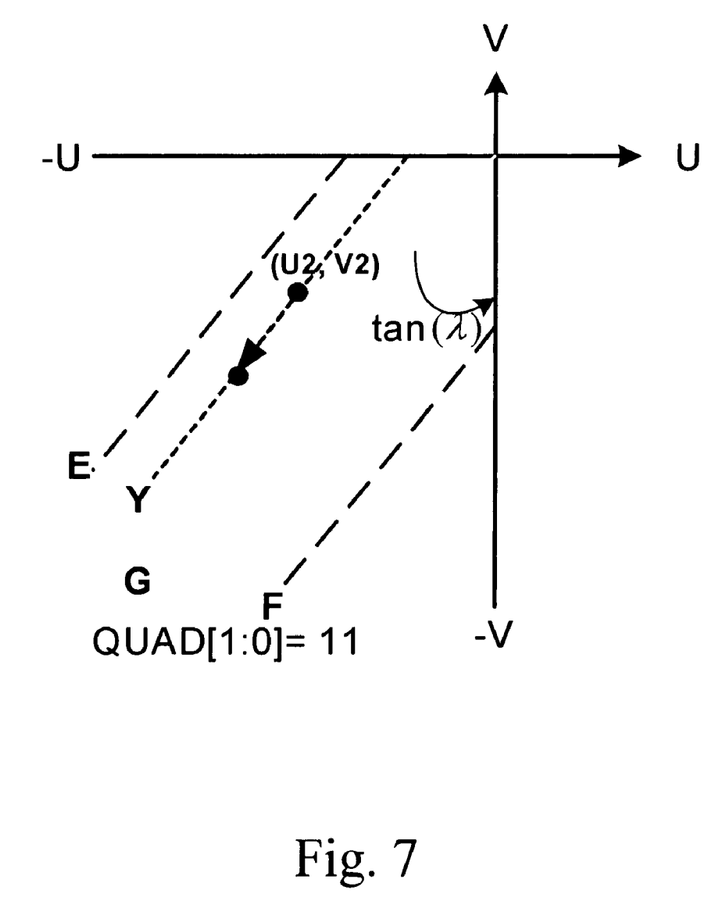
FIG. 7 is a hue angle of the object color located on the third quadrant of a U-V chromaticity diagram of the color space according to another preferred embodiment of the present invention.

As shown in FIG. 5, the green enhancement unit 200b receives the same color signals 101, 102 for executing enhancement proceeding. The green enhancement unit 200b receives a color angle 403 of a green tone of an object color. According to FIG. 3, the angle could be chosen in the neighborhood of 241°. Accordingly, as shown in FIG. 7, the quadrant signal 404 of a straight line G is indicative of the third quadrant and delivered to the green enhancement unit 200b. In addition, a compensating range setting 405 is specified between straight lines E, F as shown in FIG. 7. The green enhancement unit 200b receives the compensating range setting 405, color gains 406, 407 and executes green enhancement function to generate outputs of green tone gains 408, 409.

Similarly, if another color needs enhancement processing, the corresponding color enhancement processing unit is added into the system and the necessary parameters are inputted to the corresponding color enhancement processing unit to do the color enhancement processing. A gain unit 500 receives the outputs of the skin tone correction unit 200a and the green enhancement unit 200b such as skin tone gains 308, 309 and green tone gains 408, 409 for adjusting the magnitude of the skin tone gains 308, 309 and green tone gains 408, 409, thereby obtaining output gains 501, 502. An output correction unit 600 receives output gains 501, 502 to execute the color correction by utilizing output gains 501, 502 and outputs correction signals 601 and 602.

Figure 8:
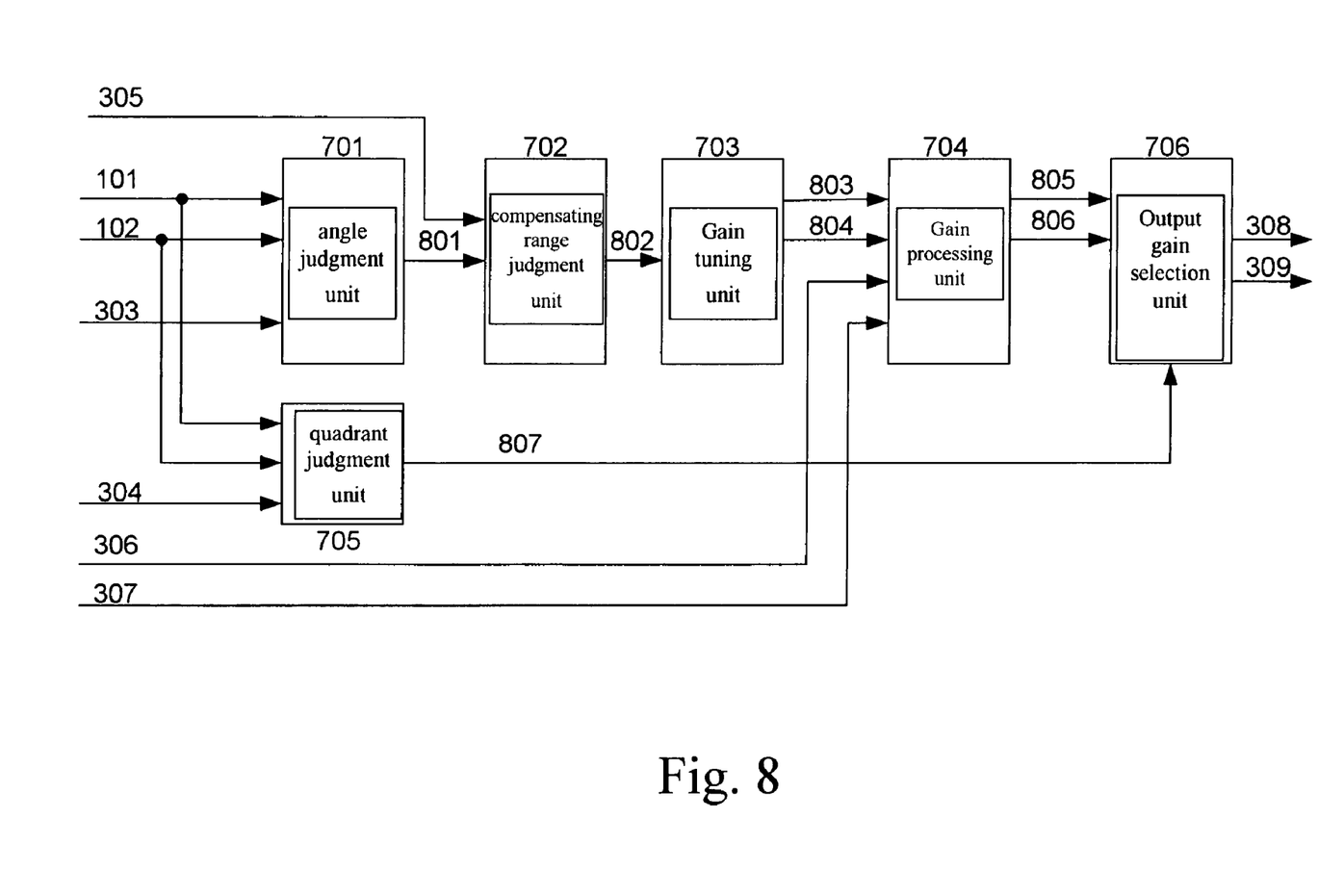
FIG. 8 is a block diagram showing a skin tone correction unit according to a preferred embodiment of the present invention is illustrated.

Referring to FIG. 8 of the drawings, a block diagram showing a skin tone correction unit according to a preferred embodiment of the present invention is illustrated. The block diagram of FIG. 8 could also be applied to the green enhancement unit 200b. The detail description of the block diagram is expressed below.

As shown in FIG. 8, an angle judgment unit 701 receives a pixel of a digital color image data and calculates the position of the pixel located on the U-V coordinate of the color space. A straight line X making an angle θ with the negative U-axis represents the pixel of the digital color image data as shown in FIG. 6. A straight line Y making an angle λ with the negative V-axis represents the pixel of the digital color image data as shown in FIG. 7. In addition, the angle judgment unit 701 calculates the corresponding position of a hue angle of the object color, which is represented by straight lines G or J making an angle θ or λ with the U-axis and V-axis respectively, thereby generating a corresponding position signal 801. A compensating range judgment unit 702 receives the corresponding position signal 801 compared with the compensating range setting to determine whether the pixel is located within the compensating range setting or not and calculate the distance between the straight line X and the straight line G or between the straight line Y and the straight line J.

As shown in FIG. 8, a gain tuning unit 703 makes several intervals in parallel with the straight line G or the straight line J. The straight line G or the straight line J could be utilized a center line. According to the distance between the interval and the straight line G or the straight line J, it could adjust the gain of the pixel gradually in a continuous manner. In other words, the gain could be gradually increased or decreased in a continuous manner according to the distance between the interval and the straight line G or the straight line J. Accordingly, the gain tuning unit 703 receives a difference signal 802 output from the compensating range judgment unit 702 and adjusts the difference value 802 to generate tuned signals 803, 804.

As shown in FIG. 8, a gain processing unit 704 receives the adjusted signals 803, 804 multiplied by the UV gain values 306, 307. The output gain signals 805, 806 are smooth gain values processed by the gain processing unit 704.

As shown in FIG. 8, the angle judgment unit 701, the compensating range judgment unit 702, the gain tuning unit 703, and the gain processing unit 704 process any signals in which the corresponding angles of signals are located on the first quadrant of the U-V coordinate of the color space. However, according to the U-V coordinate of the color space, when signals are located on any quadrant of the U-V coordinate of the color space, a quadrant judgment unit 705 determines whether the signals are located on the desired quadrant or not, thereby generating a control signal 807. Therefore, a output gain unit selection unit 706 is controlled by the control signal 807 to do the judgment whether the output gain will be output or not.

Figure 9:
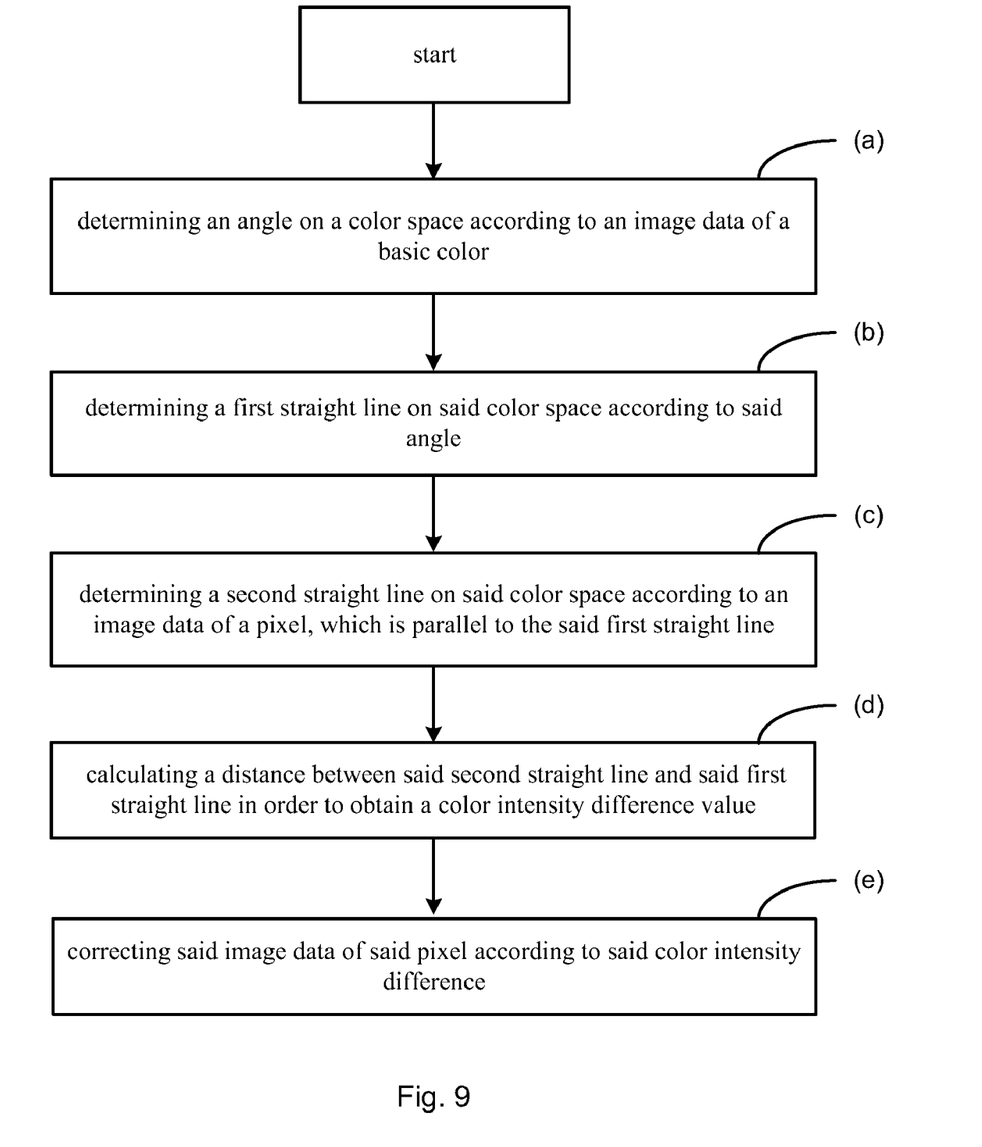
FIG. 9 is a flow chart of an image processing method for color correction according to a preferred embodiment of the present invention.

Please refer to FIG. 9 of the drawings, a flow chart of an image processing method for color correction according to a preferred embodiment of the present invention is illustrated. The image processing method for color correction comprises the steps of: (a) determining an angle on a color space according to an image data of a basic color, (b) determining a first straight line on said color space according to said angle, (c) determining a second straight line on said color space according to an image data of a pixel, which is parallel to the said first straight line, (d) calculating a distance between said second straight line and said first straight line in order to obtain a color intensity difference value, (e) correcting said image data of said pixel according to said color intensity difference.

Figure 10:
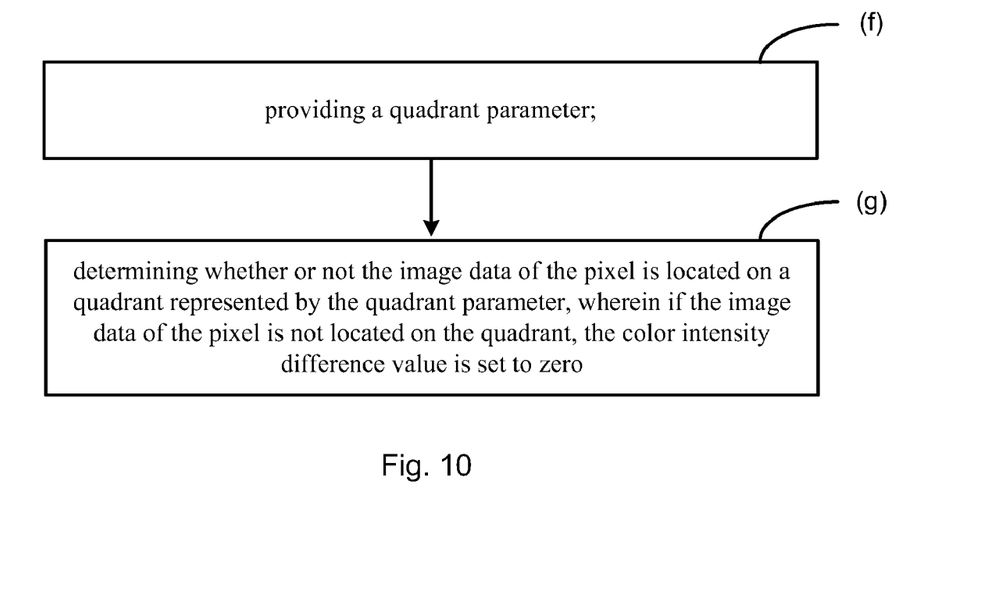
FIG. 10 of the drawings, a flow chart of an image processing method for color correction according to another preferred embodiment of the present invention.

Please refer to FIG. 10 of the drawings, a flow chart of an image processing method for color correction according to another preferred embodiment of the present invention is illustrated. The image processing method for color correction further comprises the steps of: (0 providing a quadrant parameter; and (g) determining whether or not the image data of the pixel is located on a quadrant represented by the quadrant parameter, wherein if the image data of the pixel is not located on the quadrant, the color intensity difference value is set to zero.

Figure 11:
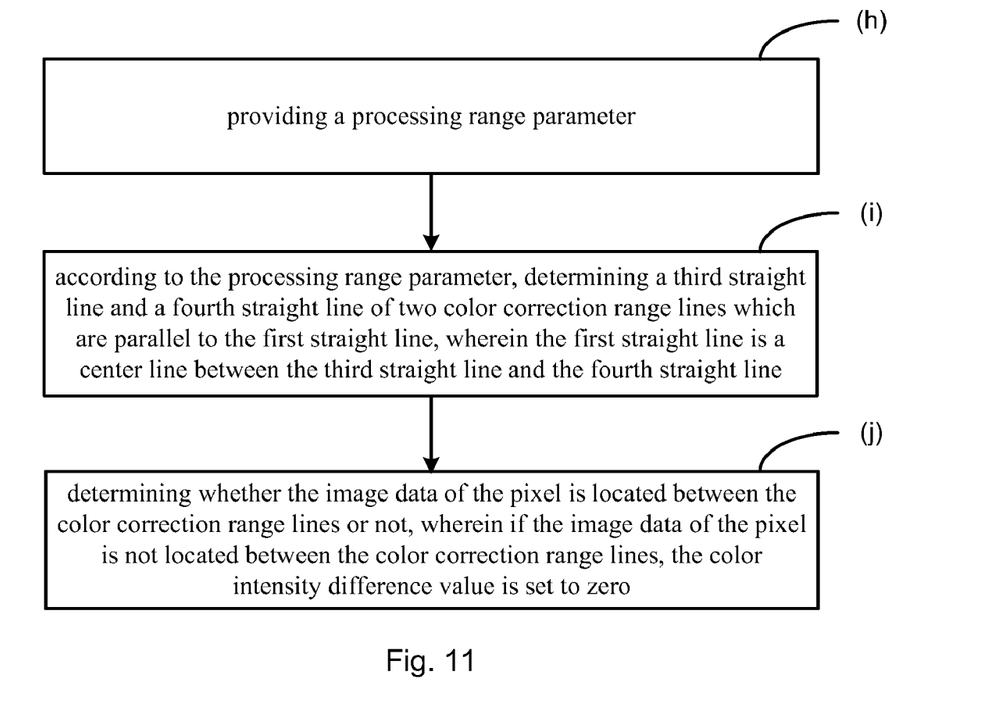
FIG. 11 of the drawings, a flow chart of an image processing method for color correction according to another preferred embodiment of the present invention.

Please refer to FIG. 11 of the drawings, a flow chart of an image processing method for color correction according to another preferred embodiment of the present invention is illustrated. The image processing method for color correction further comprises the steps of: (h) providing a processing range parameter, (i) according to the processing range parameter, determining a third straight line and a fourth straight line of two color correction range lines which are parallel to the first straight line, wherein the first straight line is a center line between the third straight line and the fourth straight line, and (j) determining whether the image data of the pixel is located between the color correction range lines or not, wherein if the image data of the pixel is not located between the color correction range lines, the color intensity difference value is set to zero.

One skilled in the art will understand that the embodiment of the present invention as shown in the drawings and described above is exemplary only and not intended to be limiting.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image processing method for color correction, comprising the steps of:

determining an angle on a color space according to an image data of a basic color;

determining a first straight line on said color space according to said angle;

determining a second straight line on said color space according to an image data of a pixel, wherein the second straight line is parallel to the said first straight line;

calculating a distance between said second straight line and said first straight line in order to obtain a color intensity difference value; and correcting said image data of said pixel according to said color intensity difference.

2. The image processing method for color correction, as recited in claim 1, further comprising the steps of:

providing a quadrant parameter; and determining whether or not said image data of said pixel is located on a quadrant represented by said quadrant parameter, wherein if said image data of said pixel is not located on said quadrant, said color intensity difference value is set to zero.

3. The image processing method for color correction, as recited in claim 1, further comprising the steps of:

providing a processing range parameter;

according to said processing range parameter, determining a third straight line and a fourth straight line of two color correction range lines, wherein said third and said fourth straight lines are parallel to said first straight line, and said first straight line is a center line between said third straight line and said fourth straight line; and determining whether said image data of said pixel is located between said color correction range lines or not, wherein if said image data of said pixel is not located between said color correction range lines, said color intensity difference value is set to zero.

4. The image processing method for color correction, as recited in claim 3, further comprising the steps of:

dividing several parallel intervals between said third straight line and said fourth straight line; and determining said color intensity difference value according to said image data of said pixel located on which of said intervals.

5. The image processing method for color correction, as recited in claim 3, further comprising the steps of:

providing at least one second processing range parameter;

determining at least one color correction range bounded line according to said at least one processing range parameter; and determining the relationship between a coordinate position of said image data of said pixel and said at least one color correction range bounded line in order to obtain said color intensity difference value.

6. The image processing method for color correction, as recited in claim 5, wherein said at least one color correction range bounded line is one of an arc line and a straight line.

7. The image processing method for color correction, as recited in claim 5, further comprising the steps of:

dividing several regions among said at least one another color correction range bounded line, said third straight line, and said fourth straight line, wherein said every region respectively corresponds to a correction value; and determining said color intensity difference value according to said correction value corresponding to said region on which said image data of said pixel is located.

8. The image processing method for color correction, as recited in claim 2, wherein said first straight line passes through the origin of the coordinates of said color space.

9. The image processing method for color correction, as recited in claim 3, further comprising the steps of:

providing a gain value; and modifying said color intensity difference value based on said gain value.

10. An image processing apparatus for color correction and enhancement, comprising:

an angle judgment unit for receiving an image data of a pixel and calculating a position of said image data of said pixel located on the coordinates of a color space, thereby calculating a distance between said image data of said pixel and a first straight line, wherein said first straight line is determined by an angle on a color space according to an image data of a basic color;

a compensating range judgment unit electrically coupled to said angle judgment unit for determining whether said image data of said pixel is located on a processing range parameter according to the comparison of said distance and said processing range parameter; and a gain tuning unit electrically coupled to said compensating range judgment unit for providing several intervals in parallel with said first straight line according to said processing range parameter, thereby determining a color intensity difference value according to said image data of said pixel located on which of said intervals, wherein the several intervals are defined by a number of straight lines parallel to said first straight line and wherein the image data of said pixel is corrected according to a color intensity difference between the said first straight line and one of the other said number of straight lines.

11. The image processing apparatus for color correction and enhancement, as recited in claim 10 further comprising a gain processing unit electrically coupled to said gain tuning unit for multiplying said color intensity difference value by a gain value, thereby generating an output gain value.

12. The image processing apparatus for color correction and enhancement, as recited in claim 11 further comprising a quadrant judgment unit for determining that said image data of said pixel locates on which quadrant of said color space, thereby generating a quadrant transfer signal.

13. The image processing apparatus for color correction and enhancement, as recited in claim 12 further comprising an output gain selection unit electrically coupled to said gain processing unit and said quadrant judgment unit for performing a quadrant transformation of said output gain value according to said quadrant transfer signal.

14. The image processing apparatus for color correction and enhancement, as recited in claim 10, wherein said first straight line passes through the origin of the coordinates of said color space.

* * * * *